Figure 1:
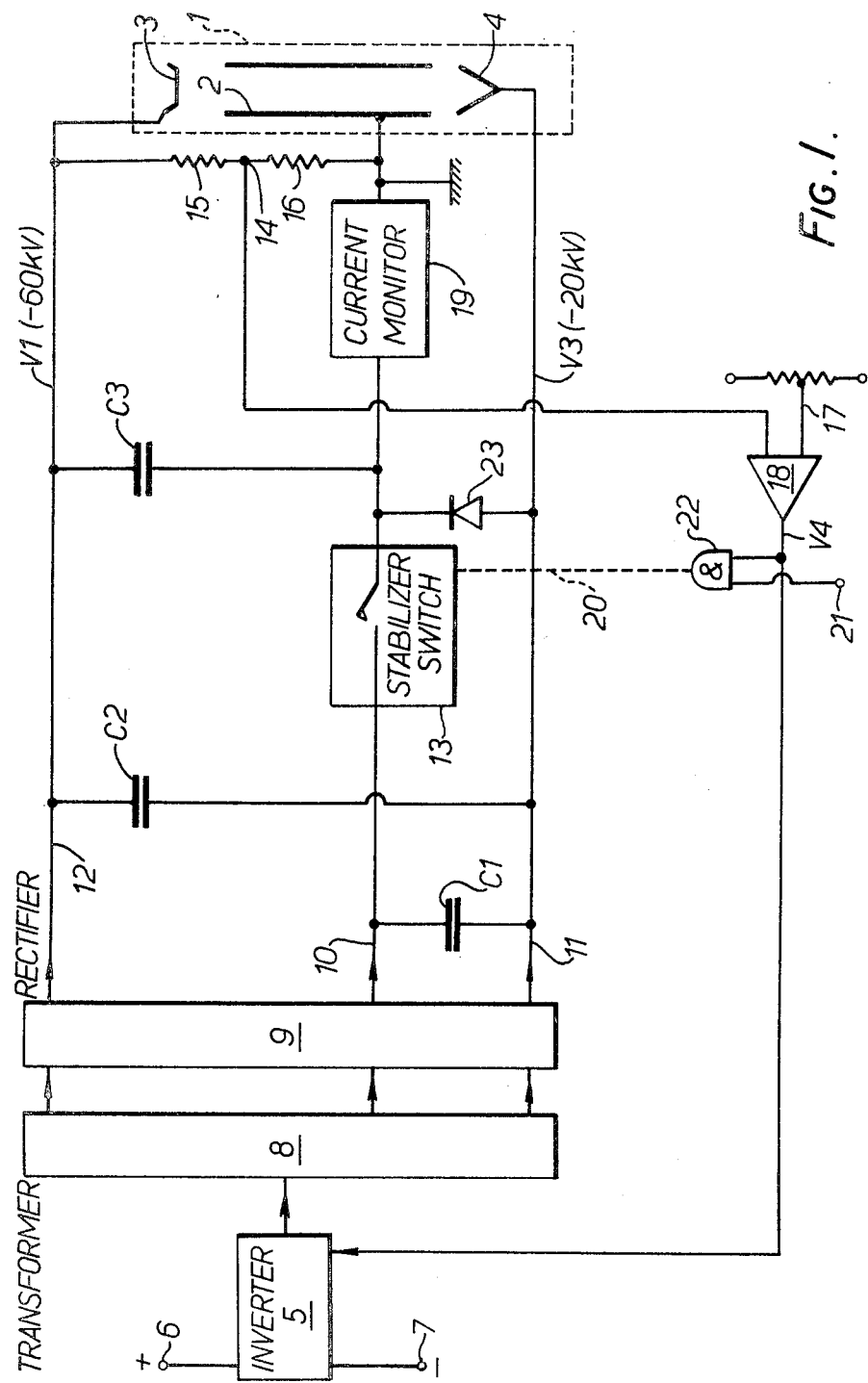

United States Patent [19]

Cherry

[11] 4,404,622

[45] Sep. 13, 1983

[54] STABILIZED POWER SUPPLY

[75] Inventor: Peter J. Cherry, Huncote, England

[73] Assignee: The Marconi Company Limited, Chelmsford, England

[21] Appl. No.: 355,844

[22] Filed: Mar. 8, 1982

[30] Foreign Application Priority Data

Mar. 6, 1981 [GB] United Kingdom ............... 8107168

[51] Int. Cl.³ .................... H02M 3/315; H02P 13/18
[52] U.S. Cl. ........................... 363/27; 320/1;
328/267; 363/28; 363/96
[58] Field of Search ................... 307/130; 320/1;
328/262, 263, 267; 363/27, 28, 62, 96

[56] References Cited

U.S. PATENT DOCUMENTS 3,316,445 4/1967 Ahrons ................ 320/1 X

Primary Examiner—William M. Shoop

Attorney, Agent, or Firm—Spencer & Kaye

[57] ABSTRACT

A stabilized power supply which is particularly suitable for use at very high voltages derives its energy from a resonant inverter feeding a transformer and rectifier. The power supply is intended to be operated in a pulsed mode with the generation of each pulse reducing the output voltage below its required value. The output capacitive stages of the power supply are subsequently re-charged and an input switch is rendered non-conductive when the output voltage regains its required value. As it is not possible to switch off a resonant inverter during the course of a cycle, the energy obtained from the inverter during the remainder of the current cycle is fed into another capacitive stage. The second stage may also be utilized as an unregulated output rail of the power supply. The invention is particularly suitable for power travelling wave tube amplifiers.

10 Claims, 3 Drawing Figures

FIG. I.

STABILIZED POWER SUPPLY

This invention relates to stabilised power supplies and is particularly applicable to power supplies in which a current derived from an inverter circuit is used to charge an output capacitor to a required voltage level.

According to this invention, a stabilised power supply includes a resonant inverter circuit arranged to generate an a.c. voltage from input d.c. power applied to it; a transformer for receiving the a.c. voltage and transforming it to a different a.c. voltage; a rectifier for converting the a.c. voltage to a corresponding d.c. voltage; and first and second capacitive smoothing stages which are charged by said d.c. voltage and connected to said rectifier in series, with a controllable switch being positioned between the two stages; means for monitoring the voltage on the second capacitive stage and for rendering said switch non-conductive when said d.c. voltage reaches a reference level and for maintaining the switch open until the completion of the current cycle of the resonant inverter.

The provision of the controllable switch enables the size of the two capacitive stages to be much reduced as compared with that which would be required in the absence of the switch in order to achieve a comparable degree of output voltage regulation.

A resonant inverter circuit suffers from the disadvantage that it cannot be turned off during the course of a resonant cycle, but only at the end of a cycle when its output voltage becomes substantially zero. Thus, in practice, the a.c. voltage applied to the transformer by the inverter consists of an integral number of complete a.c. cycles. The capacitive smoothing stages are charged by the rectified d.c. voltage and when output current is not being drawn from the power supply, each cycle of the resonant inverter circuit causes the voltage to the capacitive stages to increase by a particular increment. For some applications, the size of the increment may be greatly in excess of the degree of regulation which is required in the output voltage and in effect the present invention enables a stabilised d.c. voltage to be obtained from a power supply which utilises a resonant inverter, by producing an output which is not necessarily integrally related to the output of the inverter.

Figure 2:
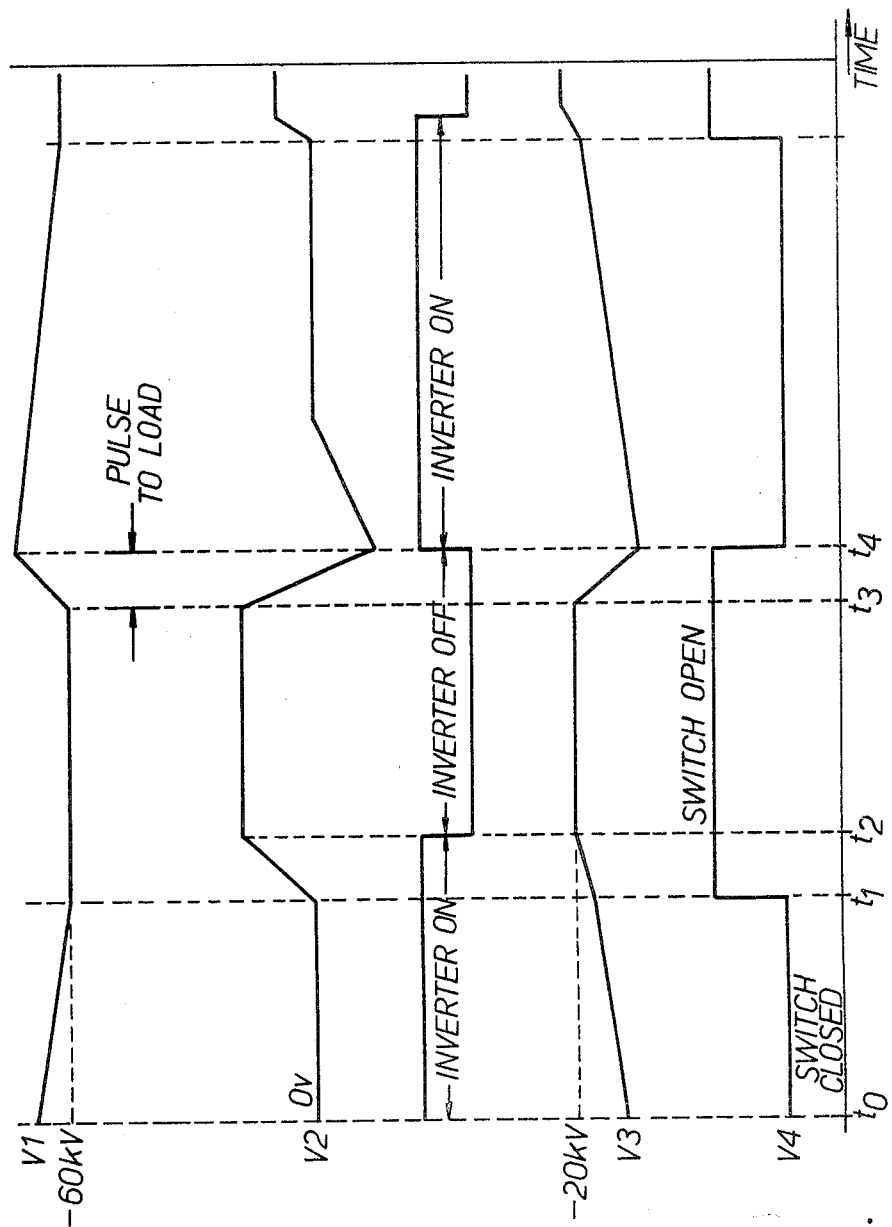
Figure 3:
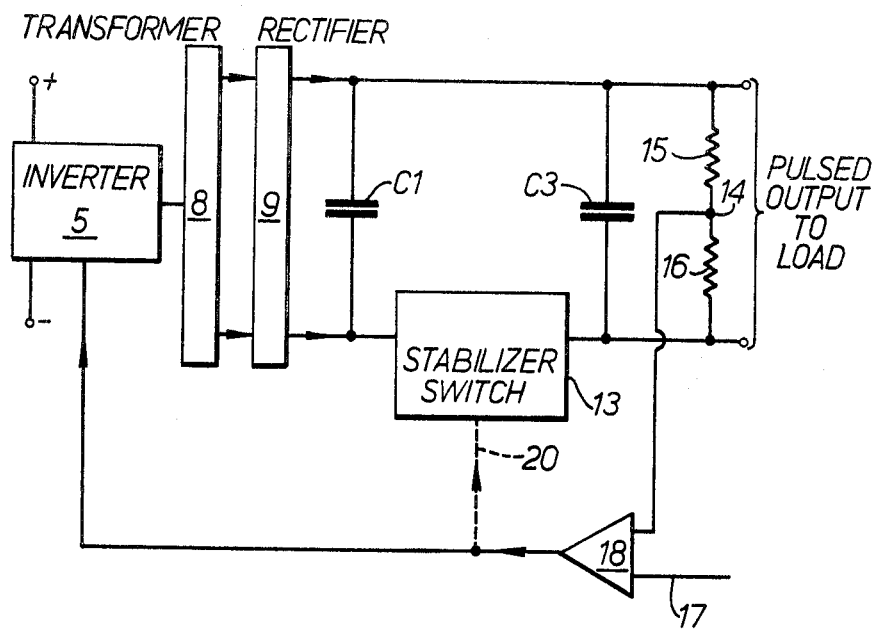

The invention is further described by way of example with reference to the accompanying drawings, in which FIG. 1 is a stabilised power supply in accordance with the present invention, FIG. 2 is an explanatory diagram relating to the operation of the power supply and FIG. 3 shows aa modified power supply.

Referring to FIG. 1, there is shown therein a stabilised power supply which is arranged to supply power to a travelling wave tube amplifier 1. Travelling wave tubes require the application of very high d.c. voltages. The casing 2 of the slow wave structure of the travelling wave tube 1 is held at earth potential and the cathode 3 is held at −60 kVs in this example. The collector 4 is held at −20 kVs and whilst the permissible voltage variation on the collector is relatively large, the voltage on the cathode 3 is permitted to vary by only a very small amount, typically about 20 volts. This imposes very stringent design considerations on the stabilised power supply at which the required stabilised voltages are generated.

The power supply itself derives its power via a resonant inverter 5, which receives d.c. voltage via terminals 6 and 7 at a relatively low level, typically about 600 volts d.c. The inverter is of the resonant kind and operates typically at a frequency of 10 kHz. That is to say, the inverter operates to chop the applied d.c. voltage at this frequency and to apply the resulting a.c. voltage to the primary winding of a transformer 8. The resonant inverter 5 is of the kind which utilises switchable thyristors, and, as is known, once a thyristor has been triggered into conduction it cannot be rendered non-conductive until the voltage appearing across it has reduced to substantially zero. The a.c. voltage generated at the inverter 5 and applied to the primary winding of the transformer 8 is stepped up by means of the transformer turns ratio to the appropriate required a.c. voltage level. This a.c. voltage is rectified by a rectifier circuit 9 and the resulting d.c. voltages are applied to the travelling wave tube 1.

The travelling wave tube 1 is not operated continuously but is instead arranged to produce a system of short output pulses. This means that the duty ratio of the travelling wave tube is relatively low, but that whilst output pulses are being generated, the power requirements of the travelling wave output are very large indeed. In order to provide short bursts of high power to the travelling wave tube, large capacitive smoothing stages are provided between the rectifier circuit 9 and the travelling wave tube 1 itself. The capacitive smoothing stages are partially discharged when the travelling wave tube is fired into conduction—typically the output voltage may reduce by about 500 volts at the cathode 3 whilst an output pulse is being generated. Subsequently the capacitive smoothing stages are re-charged from the inverter 5 via the transformer 8 and rectifier 9. The first capacitive smoothing stage comprises a capacitor C1 connected between the output point 10 of the rectifier and the collector line 11 and also the capacitor C2 connected directly between the collector line 11 and the cathode line 12. A second capacitive smoothing stage comprises a single large capacitor C3 connected directly between the cathode line 12 and the output line 10.

A stabiliser switch 13 is connected between the two capacitive stages and its purpose is to disconnect the second capacitive stage C3 when the voltage on the cathode 3 reaches it predetermined operating value. The potential on the cathode 3 is monitored at a monitor point 14 of a potentiometer formed by resistors 15 and 16. The resistor 15 has an extremely high value as compared with the resistor 16, since whereas the required operating voltage on the cathode is −60 kVs, the corresponding voltage on the monitor point 14 is typically about 6 volts. The monitor point 14 is compared with a reference level 17 at a comparator 18, the output of which is used to control the operation of the inverter 5 and the stabiliser switch 13.

A current monitor device 19 is positioned between the stabiliser switch 13 and the casing 2, so that the travelling wave tube 1 can be disconnected if an appreciable current flows in this line under fault conditions. Because of the presence of the current monitor 19 the stabiliser switch 13 is not earthed and consequently the control signal to the stabiliser swtich 13 is applied via an optical link 20, as this enables electrical isolation to be preserved. The power supplies for operating the stabiliser switch 13 are themselves floating—that is to say they are a.c. coupled. The operation of the stabiliser switch 13 can be inhibited via an input terminal 21, which is coupled to the output of the comparator 18 at an AND gate 22.

It may be necessary for the travelling wave tube 1 to produce a rapid sequence of output pulses, and since the generation of each pulse causes the charge at the capacitive smoothing stages to partially decay these stages must be rapidly re-charged before the next following pulse is required. In order to meet this requirement, it is arranged that the voltage on line 12 rises by about 60 volts for each cycle of the inverter which is fed into the transformer 8. As previously mentioned, the operating frequency of the inverter 5 is about 10 kHz—consequently the period of each cycle is about 50 microseconds. Thus, if the regulation of the output d.c. voltage were to be achieved solely by controlling the operation of the inverter 5, the resolution obtainable would be much too coarse. Consequently, the comparator 18 detects instantaneously when the second capacitive stage C3 has reached the required operating voltage of −60 kVs and renders the stabiliser switch 13 non-conductive. An inhibit signal is applied to the inverter 5 at the same time, but the inhibit signal does not take effect until the end of the current cycle of the inverter 5 has been reached. When the stabiliser switch 13 is rendered non-conductive, the energy generated during the remainder of the current cycle of the inverter 5 is fed wholly into the first capacitive stage consisting of capacitors C1 and C2. The voltage regulation requirements of the collector 4 are much less stringent than those for the cathode 3 and the resulting variations of this d.c. output voltage are quite acceptable.

The operation of FIG. 1 is explained in more detail with reference fo FIG. 2. It is assumed that at time $t_0$, the preceding output pulse of the travelling wave tube 1 has just terminated and the voltage V1 on capacitor C3 is rising steady to regain its required value.

It reaches its required value V1 at time $t_1$ when the voltage at the monitor point 14 equals the reference level 17. At time $t_1$ the comparator 18 renders the stabiliser switch 13 non-conductive so that the voltage on capacitor C3 remains at its required value. At the same time the comparator output is used to inhibit operation of the inverter 5, and this takes effect at time $t_2$ when the end of the current inverter cycle is reached. During the remainder of the current cycle of the inverter the whole of the output from the rectifier 9 is fed solely into the first smoothing stage comprising capacitors C1 and C2 so their voltage V3 increases more rapidly until time $t_2$ when the output from the inverter 5 ceases. During the time $t_1$ to $t_2$ the output point 10 of the rectifier 9 is no longer coupled to earth via the current monitor 19, and consequently its potential V2 rises. The voltages V1, V2 and V3 remain constant until the commencement at time $t_3$ of the next output pulse from the travelling wave tube 1. During the output pulse the voltage V1 drops from its nominal value of −60 kV as capacitor C3 is partially discharged. During this time voltage V2 drops as the diode 23 is reversed biassed - the diode 23 is present to prevent the collector 4 becoming positive with respect to earth at any time as this condition could damage the travelling wave tube 1.

The drop in voltage V1 is detected at the comparator 17, which re-starts the inverter 5 and renders the stabiliser switch 13 conductive again. The voltage V2 than returns to a nominal earth value, and voltage V1 begins to recover to its required value, and the sequence of events repeats. In generate the value of V2 at time $t_2$ will be different for each switching cycle since it depends on the proportion of the inverter cycle time remaining at time $t_1$ when the required output voltage V1 is regained. It will thus be apparent that the maximum variation in voltage V2 corresponds to the maximum possible value to $t_1$ to $t_2$ which is one cycle period of inverter 5. During the sequence of events illustrated in FIG. 2, the switch 13 is not inhibited via terminal 21, so that switch 13 is free to respond to the output of the comparator 18.

Because capacitors C1, C2 and C3 operate at very high voltages it is necessary to immerse them in an electrically insulating oil, and their physical size is very much less than would be required in the absence of the switch 13, as in the absence of this switch the capacitive smoothing stages would have to be sufficiently large so that the voltage V1 increased slowly enough to be within a required output voltage range at the end of an inverter cycle. The use of the switch 13 also permits the voltage V1 to stabilise much more rapidly from zero when the power supply is initially switched on.

FIG. 3 shows a modified power supply in which only a single voltage rail is required for utilisation by a pulsed output load. Similar reference numerals are used to denote equivalent components, and the mode of operation is analogous to the arrangement shown in FIG. 1, except of course that the voltage on the first smoothing stage, represented by capacitor C1, is not utilised as an output voltage.

I claim:

1. A stabilised power supply including a resonant inverter circuit arranged to generate an a.c. voltage from input d.c. power applied to it; a transformer for receiving the a.c. voltage and transforming it to a different a.c. voltage; a rectifier for converting the a.c. voltage to a corresponding d.c. voltage; and first and second capacitive smoothing stages which are charged by said d.c voltage and connected to said rectifier in series, with a controllable switch being positioned between the two stages; means for monitoring the voltage on the second capacitive stage and for rendering said switch non-conductive when said d.c. voltage reaches a reference level and for maintaining the switch open until the completion of the current cycle of the resonant inverter.

2. A power supply as claimed in claim 1 and wherein the inverter is turned off at the end of its current cycle.

3. A power supply as claimed in claim 1 and wherein said switch is maintained non-conductive whilst said d.c. voltage equals or exceeds said reference level.

4. A power supply as claimed in claim 1 and wherein a predetermined porportion of said d.c. voltage is compared with a low threshold value, and the result of said comparison is used to control the conduction state of said switch.

5. A power supply as claimed in claim 4 and wherein the potential on said switch is allowed to float relative to earth potential, and wherein said control is applied via an electrically isolating optical signal path.

6. A power supply as claimed in claim 4 and wherein the result of said comparision is also used to turn off the inverter at the end of its current cycle.

7. A power supply as claimed in claim 1 and wherein two output voltages relative to earth are provided, the value of one of the voltages being stabilised at a predetermined value by means of said switch.

8. A power supply as claimed in claim 7 and wherein the second capacitive smoothing stage is connected between a floating potential point having a value very close to earth potential and the output point at which said stabilised voltage is provided.

9. A power supply as claimed in claim 8 and wherein said first capacitive smoothing stage comprises two capacitors, one being coupled between points at which said two output voltages are respectively provided, and the other capacitor being coupled between the input of said switch and the other of said output voltages.

10. A power supply as claimed in claim 1 and which is coupled to a travelling wave tube amplifier so as to enable a pulsed output to be obtained therefrom.

* * * * *